(12) United States Patent
Timm

(10) Patent No.: US 8,542,124 B2
(45) Date of Patent: Sep. 24, 2013

(54) ACOUSTIC LEAK DETECTOR

(75) Inventor: Miguel Angel Timm, The Woodlands, TX (US)

(73) Assignee: Axiom Technologies Inc., Houston, TX (US)

( * ) Notice: Subject to any disclaimer, the term of this patent is extended or adjusted under 35 U.S.C. 154(b) by 328 days.

(21) Appl. No.: 13/188,271

(22) Filed: Jul. 21, 2011

(65) Prior Publication Data

US 2013/0021159 A1    Jan. 24, 2013

(51) Int. Cl.
*G01M 3/24* (2006.01)
*G08B 21/00* (2006.01)

(52) U.S. Cl.
USPC ............ 340/605; 73/40.5 A; 376/252; 702/51

(58) Field of Classification Search
USPC .................. 73/40, 40.5 A, 40.5 R, 49.1, 49.2, 73/49.5, 579, 587, 591–592; 137/312, 551; 165/11.1; 181/105; 210/85, 646; 285/93; 340/540, 605, 632; 376/252; 604/12; 702/51, 702/54
See application file for complete search history.

(56) References Cited

U.S. PATENT DOCUMENTS

| | | | |
|---|---|---|---|
| 4,327,576 A | 5/1982 | Dickey et al. | |
| 4,823,600 A | 4/1989 | Biegel et al. | |
| 4,901,576 A | 2/1990 | Rademacher | |
| 5,165,417 A * | 11/1992 | Murphy, Jr. | 600/529 |
| 5,794,136 A * | 8/1998 | Buchwald et al. | 455/334 |
| 6,795,559 B1 * | 9/2004 | Taura et al. | 381/94.8 |
| 7,318,335 B2 | 1/2008 | Olesen et al. | |
| 2008/0300497 A1 * | 12/2008 | Krause et al. | 600/515 |
| 2011/0088646 A1 * | 4/2011 | Tanaya | 123/179.3 |
| 2011/0120209 A1 * | 5/2011 | Rose et al. | 73/1.82 |
| 2011/0188346 A1 * | 8/2011 | Hull | 367/35 |

* cited by examiner

*Primary Examiner* — Steven Lim
*Assistant Examiner* — Stephen Burgdorf
(74) *Attorney, Agent, or Firm* — Mossman, Kumar & Tyler PC

(57) ABSTRACT

An acoustic detector assembly for detecting a leak of a pressurized mixture of liquids and gases in a pipeline or pressurized vessel that includes an ultrasonic acoustic transducer generating an output in response to receiving an acoustical signal associated with the leaking mixture of liquids and gases, a detector connected with the acoustic transducer. The detector may include a band pass filter reducing the non-ultrasonic component of the acoustic transducer output to produce a filtered output, a loudness level detector receiving the filtered output and transmitting a "start" signal if the filtered acoustic signal reaches a specified loudness level, a time bridging module receiving the "start" signal, the time bridging module transmitting a continuous "count" signal while the "start" signal is received and for a predetermined time after the "start" signal is no longer received, and a time delay module transmitting an alarm signal if the time bridging module transmits the "count" signal for a predetermined duration.

1 Claim, 3 Drawing Sheets

Ultra Sound Gas Leakage Detection and Alarm - Block Diagram

Ultra Sound Gas Leakage Detection and Alarm - Block Diagram

ACOUSTIC LEAK DETECTOR

BACKGROUND OF THE DISCLOSURE

1. Field of Disclosure

The present disclosure relates to a devices and methods for detecting leaks of mixtures of liquids and gases.

2. The Related Art

Pipelines and pressurized vessels are often used to contain or convey mixtures of gases and liquids between two or more locations. The loss of fluids through leaks along such pipelines or pressurized vessels can impose financial losses, contaminate the environment and/or create hazardous conditions. Thus, it is desirable to quickly and efficiently identify when such leaks occur. The present disclosure addresses the need effectively identify these deleterious events.

SUMMARY OF THE DISCLOSURE

In aspects, the present disclosure provides an acoustic detector assembly for detecting leaks of pressurized mixture of liquids and gases in ruptured pipelines or pressurized vessels. The detector includes an ultrasonic acoustic transducer generating an output in response to receiving acoustical signals associated with the leak and an alarm detector connected with the acoustic transducer. The detector may include a "band pass filter" reducing the non-ultrasonic components of the acoustic transducer to produce a filtered output; a "loudness" (sound intensity) alarm detector receiving the filtered output and transmitting a "start" signal if the transducer's output has a loudness of at least the preset alarm threshold; a time bridging module receiving the "start" signal and transmitting a continuous "count" signal as long as the "start" signal is received and for a predetermined time duration after the "start" signal is no longer received; and a time delay module transmitting an alarm signal only if the time bridging module continuously transmits the "count" signal for a predetermined time duration.

The above-recited example of features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

BRIEF DESCRIPTION OF THE DRAWINGS

For detailed understanding of the present disclosure, references should be made to the following detailed description of the preferred embodiment, taken in conjunction with the accompanying drawings listed below.

DETAILED DESCRIPTION OF THE DISCLOSURE

Figure 1:
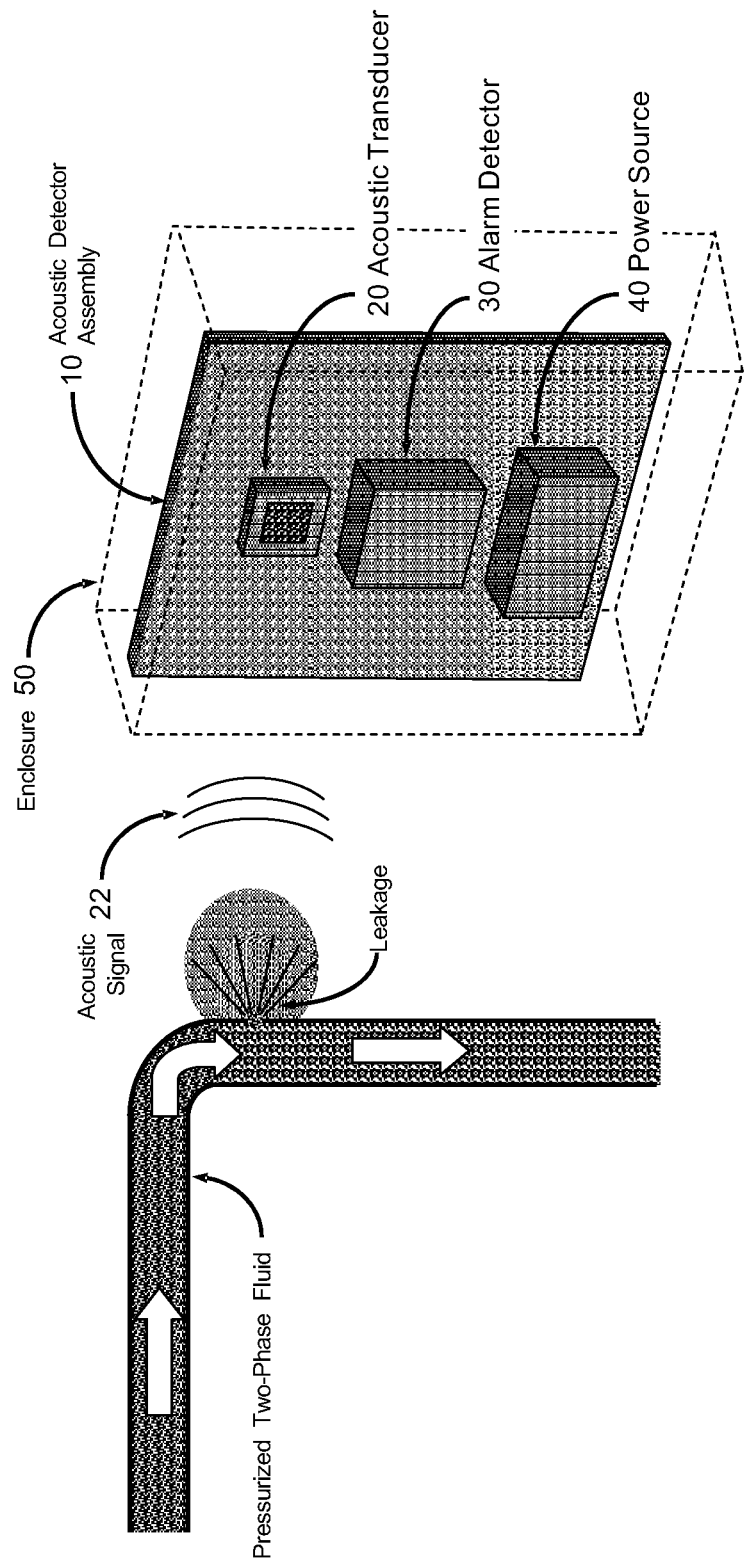
FIG. 1 illustrates one embodiment of a leak detector according to the present disclosure.

Referring to FIG. 1, there is shown one embodiment of an acoustic detector assembly 10 for detecting a leak of a pressurized mixture of liquids and gases along a pipeline or pressurized vessel. The acoustic detector assembly 10 includes features that enable the efficient detection of leaks on a pipeline or pressurized vessel containing mixture of liquids and gases.

One conventional technique for identifying pressurized gas leaks involves detecting acoustic signals that are associated with the leak. The acoustic signal from such leakage is composed of a wide range of audio frequencies components including audio and ultrasonic frequencies. A gas under pressure (e.g., over 20 psi) may emit sounds with a wide range of acoustic and ultrasonic frequencies when leaking out. As used herein, a signal or signal component is considered ultrasonic if at frequency greater than 20 KHz. Typically, leakages of pressurized liquid free gases emit a continuous ultrasonic acoustic signal. Thus, conventional acoustic gas leak detectors are configured to detect continuous acoustic signals.

However, the acoustic signal of a leaking mixture of liquids and gases may not be continuous. When the gas escapes through a leak path, an acoustical signal having ultrasonic components may be generated. But when liquid passes through the leak path, the ultrasonic acoustic signal may be significantly attenuated. For convenience, this type of leak will be referred to as a "sputtering" gas leak. Generally, an acoustical signature of a sputtering gas leak may be shown on a time graph as a segmented ultrasonic signal, the gap between the segments being caused by liquids. The time duration of the gaps may roughly correspond to the time required for the liquid to escape through a leak path. Because conventional gas leak detectors are configured to detect continuous acoustical signals associated with gas leaks, these detectors may not reliably detect leaks of mixture of liquids and gases due to the discontinuous nature of the acoustical signal. Embodiments of the present disclosure include acoustic detectors that compensate for interruptions or discontinuities in an acoustical signal generated by a leaking mixture of liquids and gases.

In one embodiment, the acoustic detector assembly 10 may include an acoustic transducer 20 responsive to an acoustical signal 22 and a detector 30 that determines whether or not the acoustical signal 22 is representative of a leak of a mixture of liquids and gases. The detector assembly 10 may be energized by a suitable power source 40, which may be an external source or a local power source. The acoustic transducer 20 and the detector 30 may be positioned in a suitable housing 50.

The acoustic transducer 20 generates an electrical output in response to receiving the acoustical signal 22. The acoustic transducer may be a microphone, or any other device that generates an electric output representative of the frequency and loudness of the acoustical signal 22.

The detector 30 transmits an alarm signal based on the characteristics of the output of the acoustic transducer 20. The detector 30 may use four preset values in order to evaluate the acoustic transducer output: (i) a frequency range (e.g., Hertz), (ii) loudness level value (e.g., voltage) iii a bridging time delay value (e.g., seconds), and (iv) a time delay value (e.g., seconds). In one arrangement, the detector 30 may initiate an alarm event upon detecting an ultrasonic acoustic signal with a loudness equal or above the alarm threshold value lasting for at least the time delay value and having time gaps below the bridging time delay value. Pipelines often are in close proximity to other sources of acoustic signals that include ultrasound frequencies. A distinguishing characteristic of the signals caused by these non-leak sources as opposed to a leak is the duration (amount of time) of the ultrasonic signal. In many instances, these non-leak sources generate an ultrasonic signal that is relatively short (e.g. ten seconds). Therefore, the detector 30 may be set with a time delay value of forty seconds (or some other value). That is, only signals that have an ultrasonic loudness equal or above alarm threshold and duration of at least forty seconds will trigger an alarm signal.

As discussed above, a sputtering gas signal includes interruptions in the ultrasonic component of the acoustic signal. If these interruptions cause segmented ultrasonic components that have durations less than the time delay value (e.g., forty seconds), then the time delay value is not satisfied and an alarm signal is not sent. Advantageously, the detector 30 incorporates a time bridging value that corresponds to the duration of an interruption. For instance, if an interruption or gap is predicted to be one second, then the time bridging value could be set at three seconds. The detector 30 uses the time bridging value to mask or compensate for sputtering-related interruptions in determining whether or not the time delay value has been satisfied.

Figure 2:
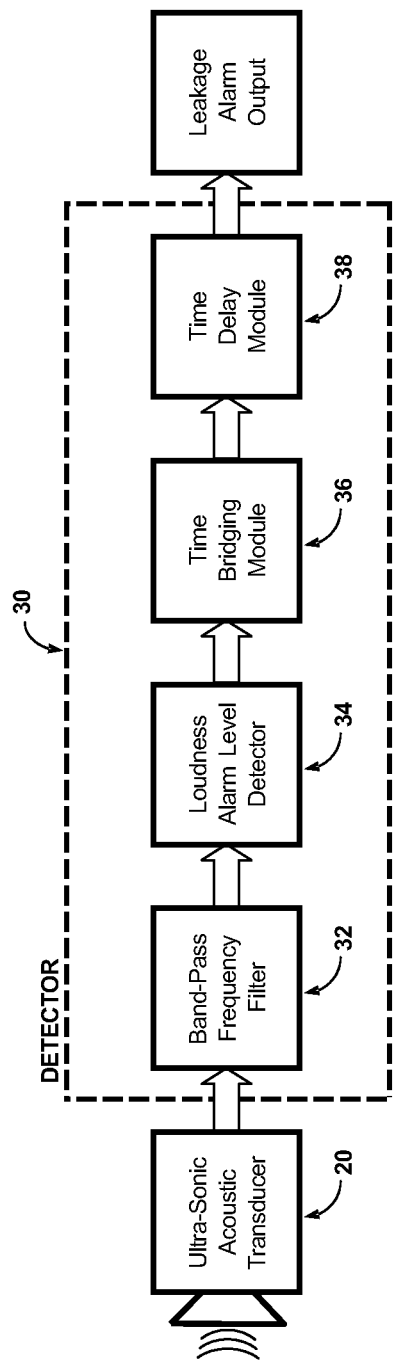
FIG. 2 illustrates in functional block diagram format the FIG. 1 embodiment according to the present disclosure.

Referring now to FIG. 2, a detector 30 configured to detect a sputtering leak may include a frequency band pass filter 32, a loudness level detector 34, a time bridging module 36, and a time delay module 38. The electronic circuitry for these components is well known in the art. Therefore, their construction will not be discussed in detail.

The band pass filter 32 reduces or removes the acoustical signals below the ultrasound frequency range from the acoustic transducer output. For instance, the low frequency and mid-frequency components of the acoustic transducer output may be removed to make the higher frequencies more discernable. The level detector 34 compares the loudness of the filtered transducer's output with the alarm threshold loudness level value. If the filtered output includes ultrasonic components that have a loudness that meets or exceeds the preset alarm threshold value, then the loudness level detector 34 transmits a signal, referred to as a "start" signal that initiates a potential alarm event.

Upon receiving the "start" signal, the time bridging module 36 transmits a "count" signal to the time delay module 38. The time bridging module 36 is set to transmit a "count" signal as long as the "start" signal is received from the level detector 34 and for a predetermined amount of time after the "start" signal is no longer received, "bridging" the gaps caused by fluids momentarily blocking the leakage path of the gas. If there is no "start" signal detected before the time bridging value expires, then the stops sending the "count" signal. However, if the "start" signal returns before the time bridging value expires, then the time bridging module 36 continues to send the "count" signal without interruption.

The time delay module 38 transmits an alarm signal if the time bridging module 36 transmits the "count" signal without interruption for a time duration specified by the time delay value. Thus, for instance, a time delay period may be forty seconds. If the "count" signal terminates after twenty seconds, then an alarm signal is not sent and the time delay "count" resets to zero. If the "count" signal continues uninterrupted for at least forty seconds, then an alarm signal is sent.

Figure 3:
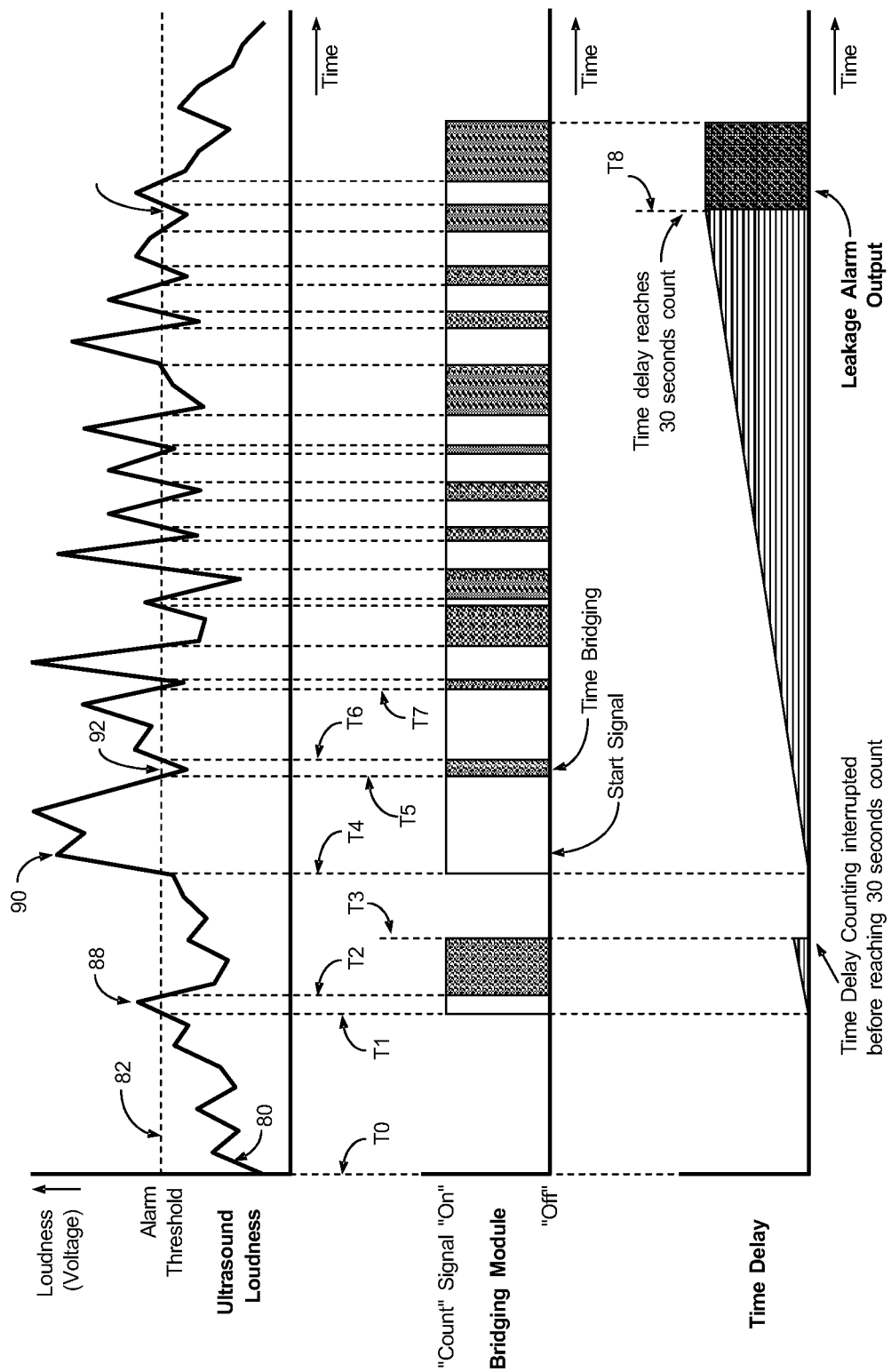
FIG. 3 shows graphs illustrating one exemplary operating mode of the FIG. 1 embodiment according to the present disclosure.

Referring now to FIG. 3, there is shown, in illustrative graphical form, the operating modes for the FIG. 1 embodiment. Line 80 represents the loudness of the ultrasonic acoustical signals detected by the acoustic transducer 20 (FIG. 1) over a period of time. A loudness alarm threshold 82 is preset as the minimum loudness of the ultrasonic acoustic signal associated with a gas leak. That is, based on pipe geometry, gas properties, and flow parameters, a gas leak may be determined to generate an acoustic signal at or above the loudness threshold 82.

Referring now to FIGS. 2 and 3, line 80 includes several events that may occur during use of the detector assembly 10 (FIG. 1) to detect gas leaks along a pipeline carrying or vessel containing a mixture of liquids and gases. During the time period starting at T0 and ending at T1, ultrasonic acoustical signals are detected, but these signals have loudness below the threshold 82. Thus, the alarm level detector 34 does not transmit a "start" signal.

Between time T1 and T2 the acoustical signal has loudness that exceeds the alarm threshold level 82 due to an event 88. In response, the alarm level detector 34 sends a "start" signal to the time bridging module 36 at time T1. The time bridging module 36 responds by transmitting a "count" signal to the time delay module 38. The "start" signal continues until time T2 (e.g., one second). At time T2, the loudness drops below the threshold level 82. However, the time bridging module 36 is set to continue transmitting the "count" signal until time T3. The time separating T2 and T3 is the preset time bridging value. For simplicity, a time bridging of three seconds will be used. At time T3 the time bridging module 36 stops sending the "count" signal to the time delay module 38 because for more than three seconds no "start" signal is being transmitted by the alarm level detector 34. The time separating T1 and T3 (four seconds total) is smaller in duration than a pre-determined time delay set into the time delay module 38, which may be a forty second time delay. Thus, no alarm signal is transmitted. The event 88 may be attributed to non-leak sources such as a discharge of pressurized air from a pneumatic device.

At time T4, the ultrasonic acoustic signal again has above threshold loudness due to an event 90. Thus, the time bridging module 36 transmits a "count" signal in response to the "start" signal sent by the alarm level detector 34. As discussed previously, leaks of mixture of liquids and gases may not generate a continuous ultrasonic signal. Rather, as liquid escapes through a leak path, the flow of escaping gas may become interrupted, attenuating or eliminating the ultrasonic components of the acoustic signal. After five seconds, an interruption in the ultrasonic component occurs at time T5 and is shown with numeral 92. However, the time bridging module 36 continues to send the "count" signal in accordance with the set time bridging value. A second later, the sputtering ends at time T6 and the ultrasonic components return to the alarm level. The alarm level detector 34 transmits a "start" signal while the time bridging module 36 is still transmitting the "count" signal due to the three seconds time bridge. Thus, the time bridging module 36 maintains the "count" signal to the time delay module 38. It should be appreciated that the "sputtering" event did not interrupt or reset operation of the time delay module 38. Rather, the time delay remains in an active mode from time T4 because the "sputtering" event at time T5 has been "bridged." Thus, "sputtering events" may be "bridged" by selecting a value for the time bridging that corresponds to the acoustical signature of a sputtering event (e.g., duration).

Starting at time T7 numerous "sputtering" events attenuating the ultrasonic sound below the alarm level causes the "start" signal to be repeatedly interrupted as the leakage of gas is momentarily interrupted or slowed down by liquid in the leakage path. Still, the interruptions are shorter than the time set on the time bridging module and the "count" signal is never removed from the time delay. Therefore, the time counting continues uninterrupted.

At time T8, the time delay module 38 finalizes the time delay "count" and transmits an alarm signal because the difference between time T4 and time T8 exceeds the preset time delay.

In another embodiment the time delay counting is momentarily suspended when the "start" signal is being interrupted but the time delay is not reset to zero until the bridging module times out and the "count" signal is no longer received. In this embodiment the time delay for the leakage alarm is based on the accumulated amount of time the "start" signal is present. The removal of the "count" signal still causes the time delay to reset the time delay to zero.

In the discussion above, purely arbitrary values are used in connection with the operation of the FIG. 1 detector merely for clarity and simplicity. It should be understood that none of the values used below are intended to limit the present disclosure in any manner.

From the above, it should be appreciated that what has been described includes, in part, an acoustic detector assembly for detecting a leak of a pressurized mixture of liquids and gases in a pipeline or pressurized vessel. The acoustic detector assembly may include an electronic ultrasonic acoustic transducer that generates an output representative of a frequency and a loudness of the ultrasonic acoustical signal associated with a leak of the mixture of liquids and gases, and an electronic detector connected with the acoustic transducer. The electronic detector may include: an electronic band pass filter that reduces non-ultrasonic components of the acoustic transducer output to produce a filtered output; an electronic alarm level detector that receives the filtered output and transmits a start signal if the filtered electronic signal has a loudness equal or above a preset alarm threshold; an electronic time bridging module that receives the start signal, the time bridging module transmitting a continuous count signal while the start signal is received and for a predetermined time after the start signal is no longer received; and an electronic time delay module that transmits an alarm signal if the time bridging module transmits a count signal for a predetermined, uninterrupted duration.

In one variant, the electronic time delay module may keep a time count as long as the start and count signals are present, suspend the time count while the start signal absent, and transmit an alarm signal if an accumulated time that the start signal is received reaches a pre-set value and while the count signal has been uninterruptedly maintained.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. Thus, it is intended that the following claims be interpreted to embrace all such modifications and changes.

I claim:

1. An acoustic detector assembly for detecting a leak of a pressurized mixture of liquids and gases in a pipeline or pressurized vessel, comprising:
   (i) an electronic ultrasonic acoustic transducer that generates an output representative of a frequency and a loudness of an ultrasonic acoustical signal associated with the leak of the pressurized mixture of liquids and gases;
   (ii) an electronic detector connected with the electronic ultrasonic acoustic transducer, the electronic detector including:
      a. an electronic band pass filter reducing non-ultrasonic components of the electronic ultrasonic acoustic transducer output to produce a filtered output;
      b. an electronic alarm level detector receiving the filtered output and transmitting a start signal if the filtered output has a loudness equal or above a preset alarm threshold;
      c. an electronic time bridging module receiving the start signal, the electronic time bridging module transmitting a continuous count signal while the start signal is received and for a predetermined time after the start signal is no longer received; and
      d. an electronic time delay module that keeps a time count as long as the start signal and continuous count signal are present, suspends the time count while the start signal is absent, and transmits an alarm signal if an accumulated time that the start signal is received reaches a pre-set value while the continuous count signal is uninterruptedly maintained.

* * * * *